Patented Sept. 3, 1935

2,012,951

UNITED STATES PATENT OFFICE 2,012,951

METHOD FOR PRODUCING GAS TIGHT SEALS

Harold S. Brinker and William B. Thomas, Denver, Colo., assignors to Motor Seal Corporation, Denver, Colo., a corporation of Colorado No Drawing. Application May 29, 1933, Serial No. 673,566

4 Claims. (Cl. 91—68)

This invention relates to a method and a product for producing gas tight seals between relatively moving bodies such as between the piston and cylinder of an engine or between the piston rings and the piston ring grooves in the pistons.

It is well known that internal combustion engines of the type employed in automobiles are subject to conditions that produce rapid wear of the piston rings and the cylinder surfaces with the result that the seal between the piston and the cylinder frequently becomes worn to such an extent that the gases produced by the burning of the gaseous mixtures escape from the combustion chamber into the crank case with a resultant loss of power. In addition to the loss of power, leaky piston rings permit oil to be pumped into the combustion chamber, thereby increasing the amount of carbon produced and increasing the cost of lubricating the engine.

When internal combustion engines have become leaky as above intimated, it is usually necessary to remove the pistons and supply them with new piston rings and it is also frequently necessary to rebore the cylinders which necessitates the use of oversized pistons. Such reconditioning of an engine is expensive and is only temporary because the reconditioned pistons and cylinders will soon wear away and become leaky. Another objection to the mechanical reconditioning of the cylinder is that when they are rebored, the case hardened inner surface is removed so as to leave only the soft cast iron that then wears away faster than the original surface.

We have discovered that if a paste is formed from unexfoliated vermiculite and oil and this paste introduced into cylinders of an internal combustion engine which is permitted to idle for a few minutes, whereby the paste will flow into the space between the cylinder wall and the piston and be forced downwardly by the pressure so as to pass into the space between the side of the piston ring and the sides of the piston ring groove and that if the parts are then heated to a temperature higher than that required for exfoliation of the vermiculite, the particles of vermiculite that have been carried into the cracks and spaces through which gases leaked will expand and form an oil and gas tight seal.

Owing to the lubricating properties provided by roasted or exfoliated vermiculite, the surfaces separated by a layer of this material will move relative to each other quite freely as the vermiculite serves as an effective lubricant.

In order to prepare the paste which is used in the sealing operation, ordinary vermiculite, which is sometimes referred to as Jeffersite, is taken from the mine and cleaned so as to remove as much as possible of the grit and sand that might be present. After the first cleaning, the vercimulite is ground to a size that will barely pass through a half inch mesh screen and is then subjected to a differential screening effect whereby the grit and foreign particles that have been reduced to a small size, will be separated from the larger vermiculite particles. After this screening operation, the vermiculite, which is then quite free from foreign matter, is ground to a fine powder and subjected to a screening operation and employing for this purpose a screen that will permit particles having a maximum dimension of less than fifteen thousandths of an inch to pass through. The vermiculite that passes through the screen will then consist of particles varying in size from one thousandth of an inch to fifteen thousandths of an inch.

The screened vermiculite is now mixed with powdered graphite and the proportions of vermiculite to graphite may vary somewhat and usually the vermiculite comprises from seventy to eighty per cent of the mixture, the balance being graphite. The mixture of graphite and vermiculite is now mixed with a mineral oil of any suitable grade or quality, but a very satisfactory paste or mixture has been obtained by employing Pennsylvania Bright Stock with which is mixed five percent of a penetrating oil. The oil and the mixture of vermiculite and graphite are thoroughly stirred so as to form a homogeneous paste which can be placed in collapsible tubes in which the paste is sold and from which it is dispensed.

When an engine is to be treated by the process defined in this application, the spark plugs are usually removed and a quantity of the paste is introduced into each cylinder. The spark plugs are now replaced, after which the engine is started and permitted to idle for a few minutes; five minutes has been found as sufficient for this purpose. During the idling of the engine the pistons and the cylinder walls are heated, but the temperature is not raised sufficiently to exfoliate the vermiculite, the heat, however, is sufficient to make the oil flow freely and this carries the graphite and vermiculite to the sides of the pistons where the mixture flows downwardly between the piston and the cylinder walls and into the space between the piston ring and the side of the piston ring groove. Some of the paste will flow through the space between the inside of the piston ring and the bottom of the groove and thence outwardly between the lower wall of the piston ring and corresponding side of the piston ring carrying groove. After the engine has been idled so as to permit the paste to flow into the openings to be sealed, the engine is loaded so that the temperature will increase during operation and it has been found that when an automobile or other internal combustion engine is operating at full load the temperature increases to such an extent that the vermiculite exfoliates.

It is well known that vermiculite has the property of expanding to many times its original size when heated above a certain temperature and since vermiculite is formed from a large number of the layers which become separated by heating, the result of the application of heat is referred to as exfoliation. When the vermiculite which has been carried into the openings through which the gas and oil formerly leaked, begins to exfoliate, these openings become completely filled with this exfoliated vermiculite with the result that a very effective seal is formed, especially between the sides of the piston rings and the sides of the piston ring grooves.

When the engine to be sealed is an internal combustion engine, the necessary heat can easily be obtained, but if the process is to be applied to a steam engine, the use of ordinary saturated steam will not raise the temperature sufficiently to produce exfoliation and therefore it is necessary to employ highly super-heated steam until the parts become sufficiently heated to exfoliate the vermiculite.

By having the particles of vermiculite of different size, it is apparent that where the space to be sealed is very small, only the smaller particles will enter, but where the space is large, a larger quantity of vermiculite will enter, and in this way the quantity of vermiculite will be properly proportioned to openings to be sealed.

From experience it has been found that when engines that are leaky and which are worn to such an extent that "piston slap" takes place during operation, are treated as above described the openings through which the gas and oil pass will be very effectively sealed and enough of the vermiculite will accumulate around the piston to prevent "piston slap".

It is evident from the above that the method of sealing herein described makes it possible to cure leaky engines very quickly and very cheaply and thus affords a great saving in the operation of the engine.

The function of the oil is to serve as a carrier for transferring the mixture of graphite and vermiculite to places where it is needed and when the temperatures are raised so as to exfoliate the vermiculite the oil volatiles leave the solid material in place.

It is preferable to have the parts warm when the paste is introduced so that it will flow readily and will not be discharged through the exhaust ports.

Having described the invention what is claimed as new is:

1. The method of forming a gas tight seal between the wall of a cylinder and a piston which consists in introducing into the cylinder a paste containing unexfoliated vermiculite that will expand when heated above a predetermined temperature, the material being ground to such fineness that it will pass into the openings through which the gas leaks, subjecting the piston and cylinder to heat of less temperature than that required to expand the material, moving the piston in the cylinder, whereby the material will flow to the openings to be sealed and then increasing the temperature to a point above that at which the material expands, whereby the material will expand and form a seal.

2. The method of forming a gas tight seal between the wall of a cylinder and a piston, which consists in introducing into the cylinder an oleaginous paste containing unexfoliated vermiculite ground to such a size that the particles thereof will enter the openings to be sealed, reciprocating the piston in the cylinder, while the temperature is maintained lower than that required for exfoliating the vermiculite whereby the vermiculite will enter the openings to be sealed, and then increasing the temperature to such a point that the vermiculite will exfoliate and form a seal.

3. The method of forming a gas tight seal between the edges of a piston ring and the sides of the piston ring groove of an engine in which the piston is mounted for reciprocation in a cylinder which consists in introducing into the cylinder an oleaginous paste containing unexfoliated vermiculite which has been ground to such size that the particles thereof can enter the space to be sealed, reciprocating the piston while maintaining the parts at a temperature below the exfoliating temperature of the vermiculite, whereby the vermiculite is brought to the desired position and then increasing the temperature above the exfoliating point, whereby the expanding vermiculite will expand and form a seal.

4. The method of forming a gas tight seal between the wall of an opening and the outer surface of a piston mounted for reciprocation therein which comprises, introducing into the space between the surfaces of the cylinder and of the piston a paste containing fine particles of unexfoliated vermiculite, and raising the temperature of the parts to such a point that the vermiculite will exfoliate whereby the vermiculite between the adjacent surfaces will expand and form a seal.

HAROLD S. BRINKER.
WILLIAM B. THOMAS.